(12) United States Patent
De Keyser et al.

(10) Patent No.: US 10,749,958 B2
(45) Date of Patent: *Aug. 18, 2020

(54) REDUCED STORAGE OF METADATA IN A DISTRIBUTED ENCODED STORAGE SYSTEM

(71) Applicant: Western Digital Technologies, Inc., San Jose, CA (US)

(72) Inventors: Koen De Keyser, Sint-Denijs-Westrem (BE); Frederik Jacqueline Luc De Schrijver, Wenduine (BE); Stijn Blyweert, Huizingen (BE); Mark Christiaens, Westrem (BE)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/961,871

(22) Filed: Apr. 24, 2018

(65) Prior Publication Data

US 2019/0327301 A1  Oct. 24, 2019

(51) Int. Cl.
*G06F 11/00* (2006.01)
*H04L 29/08* (2006.01)
(Continued)

(52) U.S. Cl.
CPC .......... *H04L 67/1097* (2013.01); *G06F 3/065* (2013.01); *G06F 3/0619* (2013.01);
(Continued)

(58) Field of Classification Search
CPC . G06F 11/108; G06F 11/1464; G06F 11/3006
See application file for complete search history.

(56) References Cited

U.S. PATENT DOCUMENTS 6,877,134 B1  4/2005  Fuller et al.
7,739,312 B2  6/2010  Gordon et al.
(Continued)

FOREIGN PATENT DOCUMENTS

WO       2017140939 A1   8/2017

OTHER PUBLICATIONS

Microsoft Computer Dictionary 4th Ed., 1999, Microsoft Press, pp. 188, 417, 212, 159.*

(Continued)

*Primary Examiner* — Christopher S McCarthy
(74) *Attorney, Agent, or Firm* — Patent Law Works LLP

(57) ABSTRACT

A data object can be encoded into a plurality of encoded data fragments and stored on backend storage elements in a distributed encoded storage system. The identifiers and metadata corresponding to each encoded fragment of the data object can be stored in a single metadata unit, which is stored on the backend as encoded fragments. The identifiers of the metadata fragments can be associated with the data object and stored on a low latency frontend storage device. Thus, the amount of metadata per data object stored on expensive low latency frontend storage is reduced to the fragment identifiers. The fragment identifiers can be quickly retrieved, and used to retrieve the identifiers and metadata corresponding to the encoded data fragments from the backend, for retrieval of the data object itself.

20 Claims, 3 Drawing Sheets

(51) Int. Cl.
   *G06F 11/20* (2006.01)
   *G06F 11/10* (2006.01)
   *G06F 3/06* (2006.01)

(52) U.S. Cl.
   CPC ........ *G06F 3/0685* (2013.01); *G06F 11/1044* (2013.01); *G06F 11/1076* (2013.01); *G06F 11/2094* (2013.01)

(56) References Cited

U.S. PATENT DOCUMENTS

| | | | |
|---|---|---|---|
| 7,778,516 B2 | 8/2010 | David et al. | |
| 8,723,703 B2 | 5/2014 | Oh et al. | |
| 8,782,011 B2 | 7/2014 | Guo | |
| 9,128,950 B2 | 9/2015 | Huang | |
| 9,256,383 B2 | 2/2016 | De Spiegeleer et al. | |
| 9,489,254 B1 | 11/2016 | Franklin et al. | |
| 9,699,255 B2 | 7/2017 | De Spiegeleer et al. | |
| 9,996,236 B1* | 6/2018 | Spencer-Harper | G06F 16/26 |
| 2013/0064286 A1* | 3/2013 | Karlsson | H04N 21/23439 375/240.02 |
| 2013/0064305 A1 | 3/2013 | Karlsson et al. | |
| 2013/0227075 A1 | 8/2013 | Barnes et al. | |
| 2014/0115182 A1 | 4/2014 | Sabaa et al. | |
| 2014/0324793 A1 | 10/2014 | Glazemakers | |
| 2015/0127975 A1 | 5/2015 | Patterson et al. | |
| 2015/0248402 A1 | 9/2015 | Patterson, III et al. | |
| 2016/0077988 A1 | 3/2016 | Tipton et al. | |
| 2016/0085681 A1 | 3/2016 | Aya et al. | |
| 2017/0123675 A1 | 5/2017 | Glazemakers | |
| 2017/0177266 A1 | 6/2017 | Doerner et al. | |
| 2017/0212680 A1 | 7/2017 | Waghulde | |
| 2017/0272100 A1 | 9/2017 | Yanovsky et al. | |
| 2018/0004745 A1 | 1/2018 | Finkelstein et al. | |
| 2018/0081821 A1 | 3/2018 | Beaverson et al. | |
| 2019/0324657 A1* | 10/2019 | De Keyser | G06F 3/0619 |

OTHER PUBLICATIONS

International Search Report and Written Opinion of Application No. PCT/US2019/019443, dated Jul. 2, 2019, p. 1-9.

* cited by examiner

REDUCED STORAGE OF METADATA IN A DISTRIBUTED ENCODED STORAGE SYSTEM

CROSS-REFERENCES TO RELATED APPLICATION

This application is related to the U.S. patent application filed with the U.S. Patent and Trademark Office under Ser. No. 15/961,869 on Apr. 24, 2018, having the same assignee and entitled Fast Read Operation Utilizing Reduced Storage of Metadata in a Distributed Encoded Storage System, the entire contents of which are hereby incorporated herein by reference.

TECHNICAL FIELD

The present disclosure pertains generally to storage systems, and more specifically to reduced storage of metadata in a distributed encoded storage system.

BACKGROUND

The rise in electronic and digital device technology has rapidly changed the way society communicates, interacts, and consumes goods and services. Modern computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick and reliable access in storage systems is important for good performance.

Distributed encoded storage systems typically divide each data object to be stored into a plurality of data pieces, each of which is encoded into a plurality of encoded data fragments. The encoded data fragments are spread across multiple backend storage elements, thereby providing a given level of redundancy. A distributed encoded storage system maintains metadata which identifies each stored data object, specifies where and how in the system each data object is stored, including where the encoded data fragments have been distributed and hence from where they can subsequently be retrieved, what type of encoding has been used, etc. For each encoded fragment of the data object, an identifier, location information and encoding information are maintained. Thus, storage of a single data object generates a large amount of associated metadata.

As noted above, a distributed encoded storage system stores the encoded data fragments on storage elements in the backend. However, because the corresponding metadata is accessed frequently and needs to be provided with a high level of responsiveness, it is typically stored on storage elements other than those of the backend, as this would lead to unacceptable delays. Typically the backend storage elements on which data objects are stored are in the form of hard disks, while the metadata is stored on expensive, fast, low latency storage elements, such as solid state disks ("SSDs"). The separate storage of metadata on SSDs leads to the problem of a higher cost and typically a reduced level of durability.

Additionally the metadata storage needs to be provided with a suitable level of redundancy. In order to provide for a sufficient level of redundancy, the SSDs are often duplicated inside each datacenter, for example by making use of a triple modular redundancy configuration with majority vote logic to ensure redundancy against individual failures of the SSDs. In order to provide for a sufficient level of responsiveness, the metadata storage could also be duplicated in several geographically dispersed datacenters of the distributed encoded storage system. Further, the stored metadata is typically made accessible by means of high bandwidth connections and provided with high levels of processing power to guarantee the desired responsiveness when processing client requests. This results in the usage of a great deal of expensive high responsive storage elements, such as SSDs, expensive high bandwidth connections and expensive processing power.

It would be desirable to address at least these issues.

SUMMARY

A data object can be encoded into a plurality of encoded data fragments and stored on backend storage elements in a distributed encoded storage system. The identifiers and metadata corresponding to each encoded fragment of the data object can be stored in a single metadata unit, which can be encoded into a plurality of metadata fragments and distributed across the backend. The identifiers of the encoded metadata fragments can be associated with the data object and stored on a low latency frontend storage device. Thus, the amount of metadata per data object stored on expensive low latency frontend storage is reduced to the metadata fragment identifiers. The fragment identifiers can be quickly retrieved, and used to retrieve the identifiers and metadata corresponding to the encoded data fragments from the backend, for retrieval of the data object itself. Per stored data object, the size of metadata that is stored on expensive storage elements with a high level of responsiveness is thus greatly reduced, without appreciably compromising system level responsiveness. In addition, because the metadata itself is stored in encoded fragments on the backend, the level of redundancy for the stored metadata can be the same as that for the encoded data fragments. Thus, the overall redundancy level of the metadata and scalability is also improved.

More specifically, the data object can be divided into a plurality of data pieces, and each data piece can be encoded into a plurality of encoded data fragments. The plurality of encoded data fragments can be transmitted to the backend of the distributed encoded data storage system, for distribution across a plurality of backend storage elements, such that the distribution provides a specific level of redundancy. A corresponding fragment identifier can be received for each one of the plurality of encoded data fragments, from the backend of the distributed encoded data storage system. (In another embodiment, the fragment identifiers can be generated or selected on the front end, and, e.g., provided to the backend for use.) The corresponding fragment identifier and associated metadata for each one of the plurality of encoded data fragments can be stored in a single metadata unit. The single metadata unit can be encoded into a plurality of encoded metadata fragments, which can, but need not, be the same fragment format as the encoded fragments. Each one of the plurality of encoded metadata fragments can be transmitted to the backend of the distributed encoded data storage system for distribution across the plurality of backend storage elements, wherein the distribution of the plurality of encoded metadata fragments across the plurality of backend storage elements provides the same specific level of redundancy as the encoded data fragments, and hence the underlying data object. In response to transmitting each one of the plurality of encoded metadata fragments, a corresponding fragment identifier can be received from the backend of the distributed encoded data storage system (or self-generated/selected on the frontend). The fragment identifiers corresponding to encoded metadata fragments can be associated with the data object. These fragment identifiers can be stored on a low latency frontend storage element, from which they can be quickly retrieved and used to obtain the data object.

A system of one or more computers can be configured to perform particular operations or actions by virtue of having software, firmware, hardware, or a combination of these installed on the system, where the software, firmware and/or hardware cause(s) the system to perform the actions. One or more computer programs can be configured to perform particular operations or actions by virtue of including instructions that, when executed by data processing apparatus, cause the apparatus to perform the actions.

One general aspect includes a computer-implemented method comprising: encoding a data object into a plurality of encoded data fragments; transmitting each one of the plurality of encoded data fragments to a backend of a distributed encoded data storage system, for distribution across a plurality of backend storage elements, wherein the distribution of the plurality of encoded data fragments across the plurality of backend storage elements provides a specific level of redundancy; in response to transmitting each one of the plurality of encoded data fragments, receiving, for each one of the plurality of encoded data fragments, a corresponding fragment identifier from the backend of the distributed encoded data storage system; for each one of the plurality of encoded data fragments, storing the corresponding fragment identifier and associated metadata in a single metadata unit; encoding the single metadata unit into a plurality of encoded metadata fragments; transmitting each one of the plurality of encoded metadata fragments to the backend of the distributed encoded data storage system for distribution across the plurality of backend storage elements, wherein the distribution of the plurality of encoded metadata fragments across the plurality of backend storage elements provides the specific level of redundancy; in response to transmitting each one of the plurality of encoded metadata fragments, receiving, for each one of the plurality of encoded metadata fragments, receiving a corresponding fragment identifier from the backend of the distributed encoded data storage system; associating the fragment identifiers corresponding to the encoded metadata fragments with the data object; and storing the fragment identifiers corresponding to the encoded metadata fragments in a frontend storage element, wherein the frontend storage element provides faster access to stored content than backend storage elements.

Another general aspect includes a computer system comprising: a processor; system memory; a plurality of electromechanical backend storage elements; a solid state frontend storage element; instructions in the system memory programmed to encode a data object into a plurality of encoded data fragments; instructions in the system memory programmed to transmit each one of the plurality of encoded data fragments to a backend of a distributed encoded data storage system, for distribution across the plurality of electromechanical backend storage elements, wherein the distribution of the plurality of encoded data fragments across the plurality of electromechanical backend storage elements provides a specific level of redundancy; instructions in the system memory programmed to receive, for each one of the plurality of encoded data fragments, a corresponding fragment identifier from the backend of the distributed encoded data storage system, in response to transmitting each one of the plurality of encoded data fragments; instructions in the system memory programmed to store, for each one of the plurality of encoded data fragments, the corresponding fragment identifier and associated metadata in a single metadata unit; instructions in the system memory programmed to encode the single metadata unit into a plurality of encoded metadata fragments; instructions in the system memory programmed to transmit each one of the plurality of encoded metadata fragments to the backend of the distributed encoded data storage system for distribution across the plurality of backend storage elements, wherein the distribution of the plurality of encoded metadata fragments across the plurality of backend storage elements provides the specific level of redundancy; instructions in the system memory programmed to receive, in response to transmitting each one of the plurality of encoded metadata fragments, receiving, for each one of the plurality of encoded metadata fragments, a corresponding fragment identifier from the backend of the distributed encoded data storage system; instructions in the system memory programmed to associate the fragment identifiers corresponding to the encoded metadata fragments with the data object; and instructions in the system memory programmed to store the fragment identifiers corresponding to the encoded metadata fragments in the solid state frontend storage element, wherein the solid state frontend storage element provides faster access to stored content than the electromechanical backend storage elements.

Another general aspect includes a computer system comprising: means for encoding a data object into a plurality of encoded data fragments; means for transmitting each one of the plurality of encoded data fragments to a backend of a distributed encoded data storage system, for distribution across a plurality of backend storage elements, wherein the distribution of the plurality of encoded data fragments across the plurality of backend storage elements provides a specific level of redundancy; means for receiving, for each one of the plurality of encoded data fragments, a corresponding fragment identifier from the backend of the distributed encoded data storage system, in response to transmitting each one of the plurality of encoded data fragments; means for storing, for each one of the plurality of encoded data fragments, the corresponding fragment identifier and associated metadata in a single metadata unit; means for encoding the single metadata unit into a plurality of encoded metadata fragments; means for transmitting each one of the plurality of encoded metadata fragment to the backend of the distributed encoded data storage system for distribution across the plurality of backend storage elements, wherein the distribution of the plurality of encoded metadata fragments across the plurality of backend storage elements provides the specific level of redundancy; means for receiving for each one of the plurality of encoded metadata fragments, in response to transmitting each one of the plurality of encoded metadata fragments, a corresponding fragment identifier from the backend of the distributed encoded data storage system; means for associating the fragment identifiers corresponding to the encoded metadata fragments with the data object; and means for storing the fragment identifiers corresponding to the encoded metadata fragments in a frontend storage element, wherein the frontend storage element provides faster access to stored content than backend storage elements.

Other embodiments of this aspect include corresponding computer systems, system means, apparatus, and computer programs recorded on one or more computer storage devices, each configured to perform the actions of the method(s).

Some implementations may optionally include one or more of the following features: that providing a specific level of redundancy further comprises: providing a predetermined level of storage redundancy associated with the distributed encoded data storage system; that the backend storage elements further comprise electromechanical storage devices; that the frontend storage element further comprises a solid state storage device; that the frontend storage element further comprises flash memory; that the frontend storage element further comprises dynamic random access memory; that storing the corresponding fragment identifier and associated metadata, for each one of the plurality of encoded data fragments, in a single metadata unit further comprises: for each one of the plurality of encoded data fragments, storing the corresponding fragment identifier received from the backend of the distributed encoded data storage system in a temporary buffer; for each one of the plurality of encoded data fragments, storing the associated metadata in the temporary buffer; and copying contents of the temporary buffer into the single metadata unit; that storing the corresponding fragment identifier and associated metadata, for each one of the plurality of encoded data fragments, in a single metadata unit further comprises: storing fragment identifiers and associated metadata in a first section of the metadata unit; and storing a first portion of contents of the data object in a second section of the metadata unit; that metadata associated with each specific one of the plurality of encoded data fragments further comprises, a storage location of the specific encoded data fragment and encoding information concerning the specific encoded data fragment; duplicating the fragment identifiers corresponding to the encoded metadata fragments across a plurality of frontend storage elements; transmitting a copy of content of the frontend storage element to the backend of the distributed encoded data storage system for storage, retrieving the stored copy from the backend, responsive to a loss of content of the frontend storage element, and storing the retrieved copy on the frontend storage element; caching content of at least one electromechanical backend storage element on the solid state frontend storage element; and that encoding a data object into a plurality of encoded data fragments further comprises dividing the data object into a plurality of data pieces, and encoding each one of the data pieces into a plurality of encoded data fragments.

Note that the above list of features is not all-inclusive, and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for reducing storage of metadata in a distributed encoded storage system. Rather than storing all of the metadata corresponding to the encoded fragments of stored data objects on expensive, low latency frontend storage devices (e.g., flash memory, DRAM, etc.), the identifiers and metadata corresponding to each distributed encoded fragment of a data object are stored in a metadata unit, which is stored on the backend as a plurality of encoded metadata fragments. The identifiers of the metadata fragments are associated with the data object and stored on a low latency frontend storage device. Thus, the amount of metadata per data object stored on expensive low latency frontend storage is reduced to the metadata fragment identifiers. These fragment identifiers can be quickly retrieved, and used to retrieve the identifiers and metadata corresponding to the encoded data fragments from the backend, for retrieval of the data object itself. Thus, per data object, the size of metadata that is stored on expensive storage elements with a high level of responsiveness is greatly reduced, without appreciably compromising system level responsiveness. In addition, because the metadata itself is stored in encoded fragments on the backend, the level of redundancy for the stored metadata can be the same as that for the encoded data fragments. Thus, the overall redundancy level of the metadata and scalability is also improved.

Figure 1:
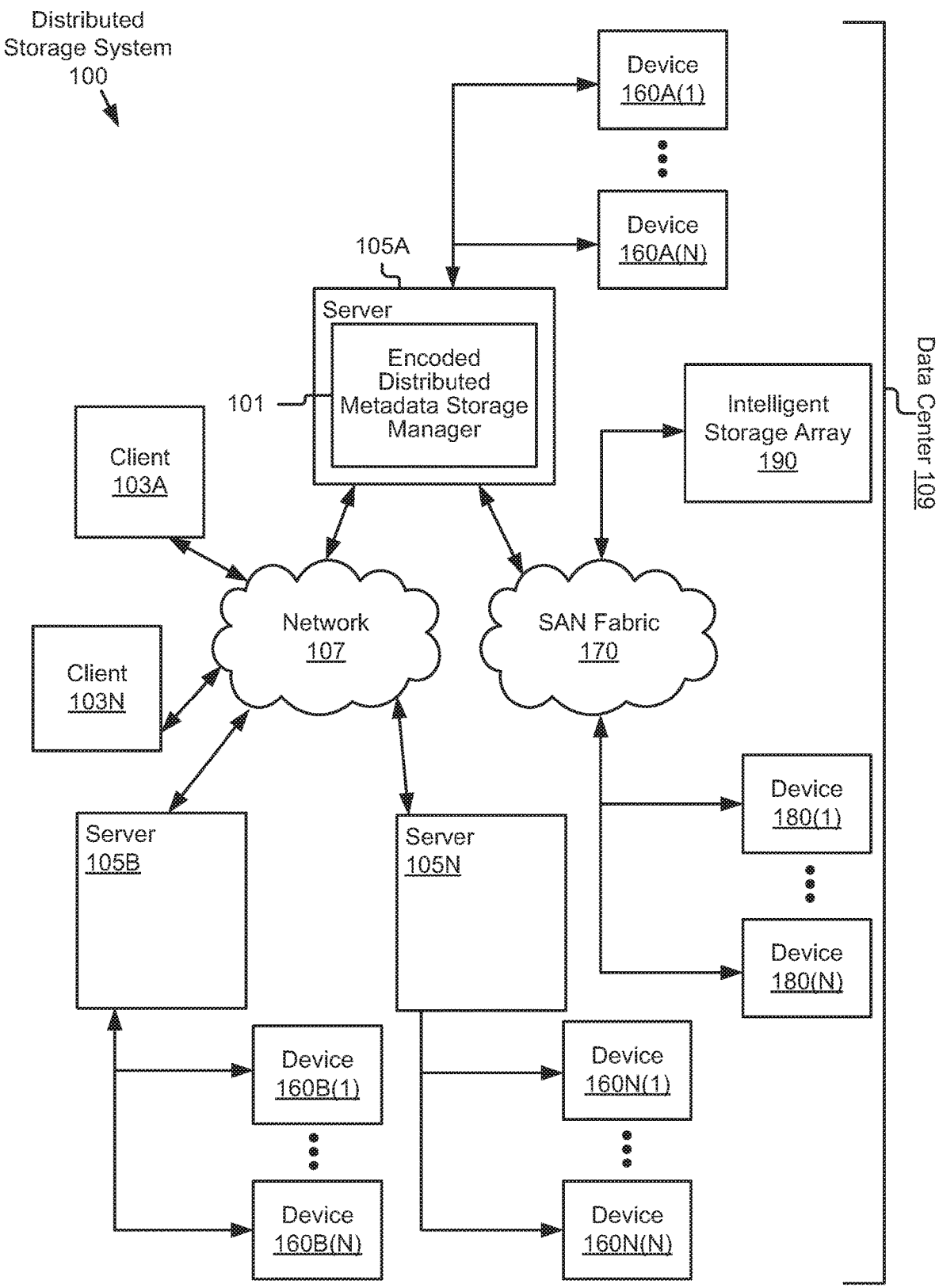
FIG. 1 is a diagram of a distributed encoded storage system in which an encoded distributed metadata storage manager can operate, according to one embodiment.

FIG. 1 illustrates an exemplary datacenter 109 in a distributed encoded storage system 100 in which an encoded distributed metadata storage manager 101 can operate, according to one embodiment. In the illustrated distributed encoded storage system 100, datacenter 109 comprises storage servers 105A, 105B and 105N, which are communicatively coupled via a network 107. An encoded distributed metadata storage manager 101 is illustrated as residing on storage server 105A. It is to be understood that the encoded distributed metadata storage manager 101 can reside on more, fewer or different computing devices, and/or can be distributed between multiple computing devices, as desired. In FIG. 1, storage server 105A is further depicted as having storage devices 160A(1)-(N) attached, storage server 105B is further depicted as having storage devices 160B(1)-(N) attached, and storage server 105N is depicted with storage devices 160N(1)-(N) attached. It is to be understood that storage devices 160A(1)-(N), 160B(1)-(N) and 160N(1)-(N) can be instantiated as electromechanical storage such as hard disks, solid state storage such as flash memory, other types of storage media, and/or combinations of these.

Although three storage servers 105A-N each coupled to three devices 160(1)-(N) are illustrated for visual clarity, it is to be understood that the storage servers 105A-N can be in the form of rack mounted computing devices, and datacenters 109 can comprise many large storage racks each housing a dozen or more storage servers 105, hundreds of storage devices 160 and a fast network 107. It is further to be understood that although FIG. 1 only illustrates a single datacenter 109, a distributed encoded storage system can comprise multiple datacenters 109, including datacenters 109 located in different cities, countries and/or continents.

Figure 2:
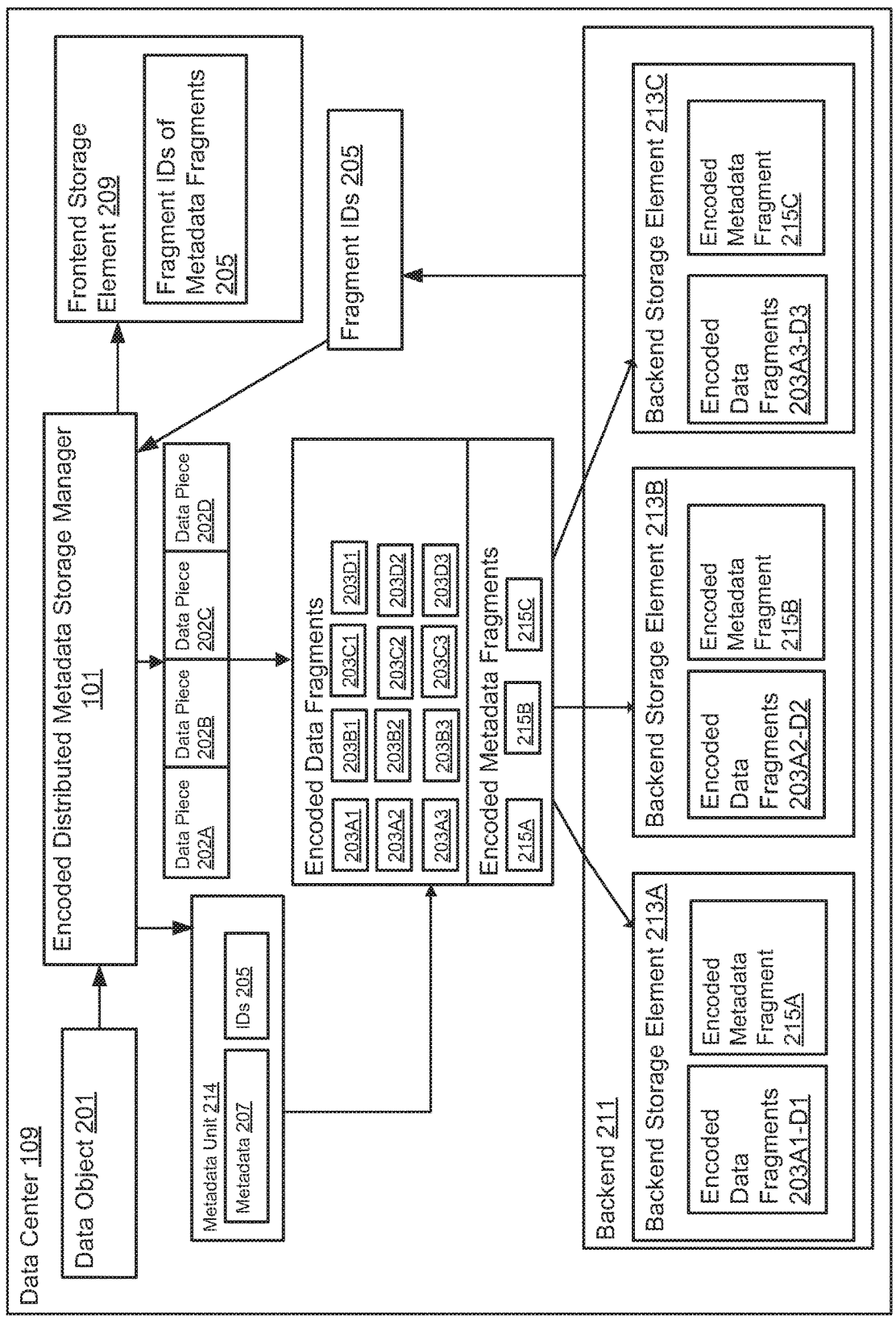
FIG. 2 is a diagram illustrating the operation of an encoded distributed metadata storage manager, according to one embodiment.
Figure 3:
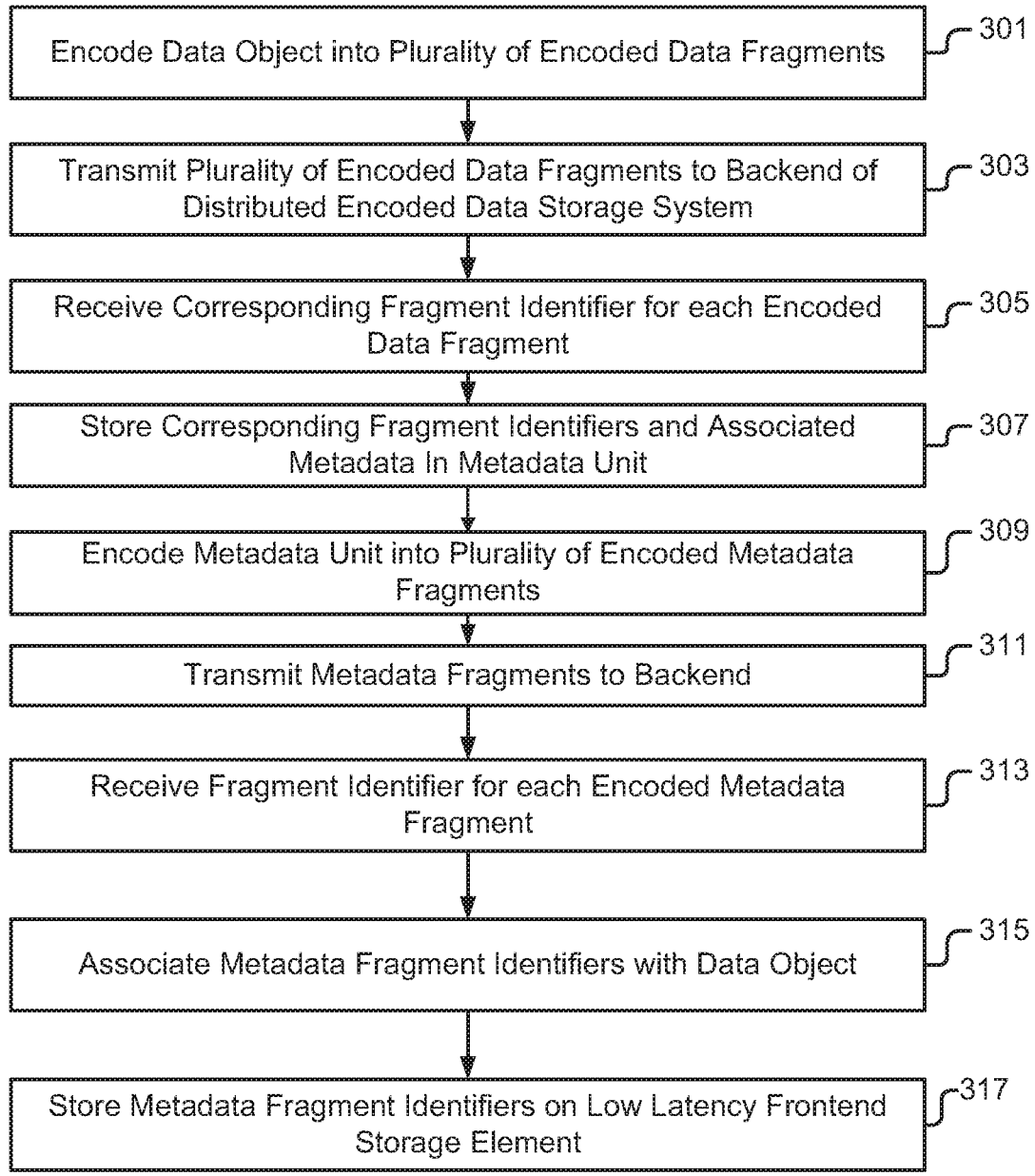
FIG. 3 is a flowchart illustrating the operation of an encoded distributed metadata storage manager, according to one embodiment.

It is to be understood that although the embodiment described in conjunction with FIG. 2-3 is directed to object storage, in other embodiments the encoded distributed metadata storage manager 101 can operate in the context of other storage architectures. As an example of another possible storage architecture according to some embodiments, server 105A is depicted as also being connected to a SAN fabric 170 which supports access to storage devices 180(1)-(N). Intelligent storage array 190 is also shown as an example of a specific storage device accessible via SAN fabric 170. As noted above, SAN 170 is shown in FIG. 1 only as an example of another possible architecture to which the encoded distributed metadata storage manager 101 might be applied in another embodiment. In yet other embodiments, shared storage can be implemented using FC and iSCSI (not illustrated) instead of a SAN fabric 170.

Turning to FIG. 2, in one example embodiment, the encoded distributed metadata storage manager 101 reduce the size of the metadata 207 stored on low latency frontend storage element 209, and better matches the level of redundancy of the metadata 207 to the level of redundancy of the corresponding stored data. As shown in the FIG. 2, the encoded distributed metadata storage manager 101 first divides a data object 201 (for example of size 256 MB, although data objects 201 can be of different sizes in different embodiments) into a plurality of data pieces 202. FIG. 2 illustrates the data object 201 being divided into four data pieces (202A, 202B, 202C and 202D) for clarity of illustration. Typically, a data object 201 would be divided into (many) more data pieces 202 in practice. For example, each data piece 202 could be of size 1 MB, although data pieces 202 can be of different sizes in different embodiments.

The encoded distributed metadata storage manager 101 encodes each one of these data pieces 202 into a plurality of corresponding encoded data fragments 203, which are distributed across multiple backend storage elements 213 to provide a given level of redundancy. For example, FIG. 2 illustrates each separate data piece 202A-D being encoded into three separate encoded data fragments, e.g., 203A1, 203A2 and 203A3, etc. It is to be understood that three is just an example number of data fragments 203, and data pieces 202 can be divided into more (or fewer) data fragments 203 as desired. It is to be further understood that the specific encoding format used to encode the data pieces 202 into encoded data fragments 203 can vary between embodiments, as can the size of the encoded data fragments 203.

The encoded distributed metadata storage manager 101 then provides these encoded data fragments 203 to the backend 211 of the distributed encoded data storage system 100, where they are redundantly distributed across multiple backend storage elements 213, thereby providing a specific level of redundancy (e.g., a predetermined level of storage redundancy associated with the distributed encoded data storage system 100). For example, in an embodiment in which each data piece 202 is encoded into three encoded data fragments 203, the data fragments can be distributed across three separate backend storage elements 213. The specific level of redundancy to provide is a variable design parameter.

It is to be understood that low latency frontend storage elements 209 may be in the form of SSDs such as flash memory devices, whereas backend storage elements 213 may be in the form of hard disks or other forms of electromechanical storage devices. Because solid state storage has significantly faster access times than the electromechanical storage, frontend storage elements 209 typically provide faster access to stored content than backend storage elements 213. In addition, solid state storage is significantly more expensive per megabyte than electromechanical storage.

For each encoded data fragment 203 transmitted to the backend 211 for storage, the backend 211 returns a corresponding fragment identifier 205. As noted above, in other embodiments fragment identifiers can be generated/selected on the frontend and provided to the backend for use. In addition, metadata 207 concerning each encoded data fragment 203 stored on the backend 211 is generated, such as the storage location of the specific encoded data fragment 203 (e.g., information enabling the subsequent retrieval of the encoded data fragment 203), encoding information concerning the specific encoded data fragment 203 (e.g., the encoding format used and any relevant parameters), relationship information between the specific encoded data fragment 203 and its corresponding data piece 202, relationship information between the specific encoded data fragment 203 and other encoded data fragments 203 and/or relationship information between the multiple data pieces 202 of the data object 201 (e.g., information enabling the reconstruction of the underlying data object 201 from the plurality of fragments 203), etc. It is to be understood that the specific format and/or content of metadata 207 concerning encoded data fragments 203 can vary between embodiments.

For each encoded data fragment 203, the encoded distributed metadata storage manager 101 stores the corresponding fragment identifier 205 and associated metadata 207 in a single metadata unit 214, which is then encoded into a plurality of encoded metadata fragments, e.g., 215A, 215B and 215C. It is to be understood that the metadata unit 214 is analogous to a data piece 202. In addition, the metadata unit 214 can be the same size (e.g., 1 MB) as the data pieces 202. In one embodiment, in order to construct the metadata unit 214, as fragment identifiers 205 are returned from the backend 211, the fragment identifiers and corresponding metadata 207 and stored in a temporary buffer. The contents of the temporary buffer is then copied into the single metadata unit 214. In one embodiment, the fragment identifiers 205 and associated metadata 207 are stored in a first section of the metadata unit 214, and a first portion of contents of the data object 201 is stored in a second section of the metadata unit 214. In this embodiment, when the data object 201 is being retrieved from the backend 211, the first section of the data object 201 can be quickly retrieved and provided to the requesting party as described in more detail below.

The encoded distributed metadata storage manager 101 transmits the multiple encoded metadata fragments 215 encoded from the metadata unit 214 to the backend 211 of the distributed encoded data storage system 100 for storage, as was done with the encoded data fragments 203. In response to transmitting each encoded metadata fragment 215, a corresponding fragment identifier 205 is received from the backend 211. In other words, the backend 211 returns a fragment identifier 205 for each encoded metadata fragment 215, as it did for the encoded fragments 203. And like the encoded data fragments 203, the backend 211 redundantly distributes the encoded metadata fragments 215 across multiple backend storage elements 213, thereby providing the same level of redundancy for the encoded metadata fragments 215 as for the encoded data fragments 203

(e.g., the predetermined level of storage redundancy associated with the distributed encoded data storage system 100).

The encoded distributed metadata storage manager 101 associates the metadata fragment identifiers 205 with the data object 201, and stores the metadata fragment identifiers 205 on a frontend storage element 209, which as noted above provides faster access to stored content than backend storage elements 213. It is to be understood that the metadata fragment identifiers 205, which are just the fragment identifiers 205 that identify the metadata fragments 215, are much smaller (for example, 16 bytes) than the identifiers 205 and associated metadata 207 (e.g., hundreds of kilobytes) corresponding to all of the encoded data fragments 203. Thus, the space consumed per data object 201 of the fast, low latency, expensive frontend storage elements 209 is reduced.

In one embodiment, low latency frontend storage elements 209 may be in the form of media other than flash memory, such as dynamic random access memory (DRAM). DRAM is typically faster but more expensive than flash memory. Unlike flash memory, DRAM is volatile, quickly losing its data without power. In one embodiment a copy of the contents of a frontend storage element 209 (e.g., the metadata fragment identifier 205, which is small in size) can be provided to the backend 211 for storage. This enables the contents of the frontend storage element 209 to be rebuilt from the copy stored on the backend 211, for example in the case where the contents of the frontend storage are lost due to, e.g., a lapse in supplied power to volatile storage elements such as DRAM.

Because the amount of frontend storage space utilized is minimal, content stored on the backend 211 (e.g., encoded data fragments 203) can be cached to frontend storage in one embodiment, thereby improving overall performance. The amount of frontend storage space to utilize as a cache in this content is a variable design parameter.

Note that even where the metadata fragment identifiers 205 are distributed across multiple frontend storage elements for redundancy (e.g., multiple frontend storage elements 209 per datacenter 109, or across multiple datacenters 109), the total amount of low latency frontend storage space utilized is still orders of magnitude less than in conventional systems in which all of the metadata 207 is stored on the frontend 209.

In addition, the use of the encoded distributed metadata storage manager 101 as described above has minimal impact on the operation of the distributed storage backend 211, as the metadata fragments 215 can be processed by the backend 211 in the same or a similar way as any other encoded fragments 203. Thus, the metadata fragments 215 can be stored on the backend 211 in a way that provides the same level of redundancy as is provided for the data object 201.

Because the fragment identifiers 205 that identify the metadata fragments 215 are stored on fast, low latency frontend storage 209, they can be retrieved quickly. Because the metadata fragment identifiers 205 are linked to the data object 201, they can be used to retrieve the data object 201 from the backend 211. More specifically, metadata fragments 215 identified by the metadata fragment identifiers 205 can first be retrieved from the backend 211, and used to recreate the single metadata unit 214. This metadata unit 214 contains the identifiers 205 and associated metadata 207 for all of the encoded data fragments 203 of the data object 201, which can thus be retrieved from the backend. As noted above, in one embodiment the metadata unit 214 also stores an initial part of the contents of the data object 201. As described in related application Ser. No. 15/961,869, the initial part of the contents of the data object 201 in the metadata unit 214 can be used to begin the fulfillment of an access request, while the encoded data fragments 205 are being retrieved.

Thus, the use of the encoded distributed metadata storage manager 101 as described above ensures that the storage capacity per data object 201 for metadata 207 on expensive low latency storage elements 209 with a high level of responsiveness is reduced, without compromising system level responsiveness. The overall redundancy level of the metadata 207 and scalability is also improved.

FIG. 3 is a flowchart illustrating steps that may be performed by the encoded distributed metadata storage manager 101, according to one embodiment. The encoded distributed metadata storage manager 101 encodes 301 a data object 201 into a plurality of encoded data fragments 203. The encoded distributed metadata storage manager 101 transmits 303 the plurality of encoded data fragments 203 to the backend 211 of the distributed encoded data storage system 100, for distribution across a plurality of backend storage elements 213, such that the distribution provides a specific level of redundancy. The encoded distributed metadata storage manager 101 receives 305 a corresponding fragment identifier 205 for each one of the plurality of encoded data fragments 203, from the backend 211 of the distributed encoded data storage system 100. The encoded distributed metadata storage manager 101 stores 307 the corresponding fragment identifier 205 and associated metadata 207 for each one of the plurality of encoded data fragments 203 in a single metadata unit 214. The encoded distributed metadata storage manager 101 encodes 309 the single metadata unit 214 into a plurality of encoded metadata fragments 215. (Note that metadata fragments 215 may but need not be of the same fragment format as the encoded data fragments 205). The encoded distributed metadata storage manager 101 transmits 311 each one of the plurality of encoded metadata fragments 215 to the backend 211 of the distributed encoded data storage system 100, for distribution across the plurality of backend storage elements 213. (Note that the distribution of the plurality of encoded metadata fragments 215 across the plurality of backend storage elements 213 provides the same specific level of redundancy as the encoded data fragments 203, and hence the underlying data object 201.) In response to transmitting each one of the plurality of encoded metadata fragments 215, the encoded distributed metadata storage manager 101 receives 313 a corresponding fragment identifier 205 from the backend 211 of the distributed encoded data storage system 100. The encoded distributed metadata storage manager 101 associates 315 the fragment identifiers 205 corresponding to the encoded metadata fragments 215 with the data object 201, and stores 317 these fragment identifiers 205 on a low latency frontend storage element 209, from which they can be quickly retrieved and used to obtain the data object 201. As explained above, frontend storage elements 209 (e.g., SSDs) can provide faster access to stored content than backend storage elements 213 (e.g., hard disks).

FIGS. 1-2 illustrate an encoded distributed metadata storage manager 101 residing on a single storage server 105. It is to be understood that this is just an example. The functionalities of the encoded distributed metadata storage manager 101 can be implemented on other computing devices in other embodiments, or can be distributed between multiple computing devices. It is to be understood that although the encoded distributed metadata storage manager 101 is illustrated in FIG. 1 as a standalone entity, the illustrated encoded distributed metadata storage manager 101 represents a collection of functionalities, which can be instantiated as a single or multiple modules on one or more computing devices as desired.

It is to be understood the encoded distributed metadata storage manager 101 can be instantiated as one or more modules (for example as object code or executable images) within the system memory (e.g., RAM, ROM, flash memory) of any computing device, such that when the processor of the computing device processes a module, the computing device executes the associated functionality. As used herein, the terms "computer system," "computer," "client," "client computer," "server," "server computer" and "computing device" mean one or more computers configured and/or programmed to execute the described functionality. Additionally, program code to implement the functionalities of the encoded distributed metadata storage manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, blocks, steps, operations, elements, and/or components, but do not preclude the presence or addition of one or more other features, integers, blocks, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method, comprising:
   encoding a data object into a plurality of encoded data fragments;
   transmitting each one of the plurality of encoded data fragments to a backend of a distributed encoded data storage system, for distribution across a plurality of backend storage elements, wherein the distribution of the plurality of encoded data fragments across the plurality of backend storage elements provides a specific level of redundancy;
   for each one of the plurality of encoded data fragments, storing a corresponding fragment identifier and associated metadata in a single metadata unit;
   encoding the single metadata unit into a plurality of encoded metadata fragments;
   transmitting each one of the plurality of encoded metadata fragments to the backend of the distributed encoded data storage system for distribution across the plurality of backend storage elements, wherein the distribution of the plurality of encoded metadata fragments across the plurality of backend storage elements provides the specific level of redundancy;
   associating fragment identifiers corresponding to the encoded metadata fragments with the data object; and
   storing the fragment identifiers corresponding to the encoded metadata fragments in a frontend storage element, wherein the frontend storage element provides faster access to stored content than the backend storage elements.

2. The computer-implemented method of claim 1, wherein providing a specific level of redundancy further comprises:
   providing a predetermined level of storage redundancy associated with the distributed encoded data storage system.

3. The computer-implemented method of claim 1, wherein:
   the backend storage elements further comprise electromechanical storage devices.

4. The computer-implemented method of claim 1, wherein:
   the frontend storage element further comprises a solid state storage device.

5. The computer-implemented method of claim 1, wherein:
   the frontend storage element further comprises flash memory.

6. The computer-implemented method of claim 1, wherein:
   the frontend storage element further comprises dynamic random access memory.

7. The computer-implemented method of claim 1, wherein:
   each encoded metadata fragment is of a same fragment format as the encoded data fragments.

8. The computer-implemented method of claim 1, wherein storing the corresponding fragment identifier and associated metadata, for each one of the plurality of encoded data fragments, in a single metadata unit further comprises:
   storing fragment identifiers and associated metadata in a first section of the metadata unit; and
   storing a first portion of contents of the data object in a second section of the metadata unit.

9. The computer-implemented method of claim 1, wherein:
   metadata associated with each specific one of the plurality of encoded data fragments further comprises a storage location of the specific encoded data fragment and encoding information concerning the specific encoded data fragment.

10. The computer-implemented method of claim 1, further comprising:
    duplicating the fragment identifiers corresponding to the encoded metadata fragments across a plurality of frontend storage elements.

11. The computer-implemented method of claim 1, further comprising:
    transmitting a copy of content of the frontend storage element to the backend of the distributed encoded data storage system for storage;
    retrieving the stored copy from the backend, responsive to a loss of content of the frontend storage element; and
    storing the retrieved copy on the frontend storage element.

12. The computer-implemented method of claim 1, further comprising:
    caching content of at least one backend storage element on the frontend storage element.

13. The computer-implemented method of claim 1, wherein encoding a data object into a plurality of encoded data fragments further comprises:
    dividing the data object into a plurality of data pieces; and
    encoding each one of the data pieces into a plurality of encoded data fragments.

14. The computer-implemented method of claim 1, further comprising:
    in response to transmitting each one of the plurality of encoded data fragments, receiving, for each one of the plurality of encoded data fragments, a corresponding fragment identifier from the backend of the distributed encoded data storage system; and
    in response to transmitting each one of the plurality of encoded metadata fragments, receiving, for each one of the plurality of encoded metadata fragments, receiving a corresponding fragment identifier from the backend of the distributed encoded data storage system.

15. A computer system comprising:
    a processor;
    system memory;
    a plurality of electromechanical backend storage elements;
    a solid state frontend storage element;
    instructions in the system memory programmed to encode a data object into a plurality of encoded data fragments;
    instructions in the system memory programmed to transmit each one of the plurality of encoded data fragments to a backend of a distributed encoded data storage system, for distribution across the plurality of electromechanical backend storage elements, wherein the distribution of the plurality of encoded data fragments across the plurality of electromechanical backend storage elements provides a specific level of redundancy;
    instructions in the system memory programmed to store, for each one of the plurality of encoded data fragments, a corresponding fragment identifier and associated metadata in a single metadata unit;
    instructions in the system memory programmed to encode the single metadata unit into a plurality of encoded metadata fragments;
    instructions in the system memory programmed to transmit each one of the plurality of encoded metadata fragments to the backend of the distributed encoded data storage system for distribution across the plurality of electromechanical backend storage elements, wherein the distribution of the plurality of encoded metadata fragments across the plurality of electromechanical backend storage elements provides the specific level of redundancy;

instructions in the system memory programmed to associate fragment identifiers corresponding to the encoded metadata fragments with the data object; and instructions in the system memory programmed to store the fragment identifiers corresponding to the encoded metadata fragments in the solid state frontend storage element, wherein the solid state frontend storage element provides faster access to stored content than the electromechanical backend storage elements.

16. The computer system of claim 15, wherein providing a specific level of redundancy further comprises:

providing a predetermined level of storage redundancy associated with the distributed encoded data storage system.

17. The computer system of claim 15, wherein storing the corresponding fragment identifier and associated metadata, for each one of the plurality of encoded data fragments, in a single metadata unit further comprises:

storing fragment identifiers and associated metadata in a first section of the metadata unit; and storing a first portion of contents of the data object in a second section of the metadata unit.

18. The computer system of claim 15, wherein:

metadata associated with each specific one of the plurality of encoded data fragments further comprises a storage location of the specific encoded data fragment and encoding information concerning the specific encoded data fragment.

19. The computer system of claim 15, further comprising:

instructions in the system memory programmed to duplicate the fragment identifiers corresponding to the encoded metadata fragments across a plurality of solid state frontend storage elements.

20. A computer system comprising:

means for encoding a data object into a plurality of encoded data fragments;

means for transmitting each one of the plurality of encoded data fragments to a backend of a distributed encoded data storage system, for distribution across a plurality of backend storage elements, wherein the distribution of the plurality of encoded data fragments across the plurality of backend storage elements provides a specific level of redundancy;

means for storing, for each one of the plurality of encoded data fragments, a corresponding fragment identifier and associated metadata in a single metadata unit;

means for encoding the single metadata unit into a plurality of encoded metadata fragments;

means for transmitting each one of the plurality of encoded metadata fragments to the backend of the distributed encoded data storage system for distribution across the plurality of backend storage elements, wherein the distribution of the plurality of encoded metadata fragments across the plurality of backend storage elements provides the specific level of redundancy;

means for associating fragment identifiers corresponding to the encoded metadata fragments with the data object; and means for storing the fragment identifiers corresponding to the encoded metadata fragments in a frontend storage element, wherein the frontend storage element provides faster access to stored content than the backend storage elements.

* * * * *